US009709151B2

(12) United States Patent
Kurogi et al.

(10) Patent No.: US 9,709,151 B2
(45) Date of Patent: Jul. 18, 2017

(54) WAVE GENERATOR AND STRAIN WAVE GEARING

(71) Applicant: Harmonic Drive Systems Inc., Tokyo (JP)

(72) Inventors: Junichi Kurogi, Azumino (JP); Yoshihide Kiyosawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 318 days.

(21) Appl. No.: 14/437,213

(22) PCT Filed: Sep. 11, 2013

(86) PCT No.: PCT/JP2013/074577
§ 371 (c)(1),
(2) Date: Apr. 21, 2015

(87) PCT Pub. No.: WO2015/037087
PCT Pub. Date: Mar. 19, 2015

(65) Prior Publication Data
US 2015/0285356 A1    Oct. 8, 2015

(51) Int. Cl.
*F16H 49/00*    (2006.01)

(52) U.S. Cl.
CPC ............ *F16H 49/001* (2013.01); *Y10T 74/19* (2015.01)

(58) Field of Classification Search
CPC ............ F16H 49/001; F16H 2049/003; F16H 2049/006
See application file for complete search history.

(56) References Cited

U.S. PATENT DOCUMENTS 2,906,143 A * 9/1959 Musser ................. F16H 49/001
                                                        285/276
2,930,254 A * 3/1960 Musser ................. F16H 49/001
                                                        74/640

(Continued)

FOREIGN PATENT DOCUMENTS

JP    01-206137 A    8/1989
JP    11-072147 A    3/1999

(Continued)

OTHER PUBLICATIONS

International Search Report (PCT/ISA/210) mailed on Dec. 3, 2013, by the Japanese Patent Office as the International Searching Authority for International Application No. PCT/JP2013/074577.

*Primary Examiner* — David M Fenstermacher
(74) *Attorney, Agent, or Firm* — Buchanan Ingersoll & Rooney PC

(57) ABSTRACT

A wave generator of a strain wave gearing has a plug, a wave generator bearing mounted to an outer peripheral surface of the plug, an input shaft protruding from the center of the plug to a first side running along a center axis, and a bearing arrangement on which a support bearing supporting the input shaft is arranged. Relative to an outer ring end surface of the wave generator bearing that faces the first side, a center-side plug end surface of a plug end surface facing the same direction is in a position withdrawn from the first side toward the opposite direction. The bearing arrangement is provided between the center-side plug end surface and the outer ring end surface encircling the input shaft. The input shaft can be fitted within the width dimension of the wave generator, and a strain wave gearing having a short axial length can be achieved.

11 Claims, 2 Drawing Sheets

(56) References Cited

U.S. PATENT DOCUMENTS

| | | | | |
|---|---|---|---|---|
| 4,099,427 A | * | 7/1978 | Fickelscher | F16H 1/32 |
| | | | | 475/176 |
| 4,969,376 A | | 11/1990 | Fickelscher | |
| 7,748,118 B2 | * | 7/2010 | Kobayashi | F16H 49/001 |
| | | | | 29/893 |
| 8,776,638 B2 | * | 7/2014 | Ishikawa | F16H 55/0833 |
| | | | | 74/640 |
| 8,991,282 B2 | * | 3/2015 | Yajima | F16H 49/001 |
| | | | | 74/640 |
| 8,997,607 B2 | * | 4/2015 | Kanai | F16H 49/001 |
| | | | | 74/640 |
| 9,309,921 B2 | * | 4/2016 | Kanai | F16H 49/001 |
| 9,441,721 B2 | * | 9/2016 | Orii | F16H 57/0404 |
| 2002/0026852 A1 | | 3/2002 | Kiyosawa et al. | |
| 2002/0174742 A1 | | 11/2002 | Kobayashi | |
| 2004/0083850 A1 | | 5/2004 | Kobayashi | |
| 2004/0184691 A1 | | 9/2004 | Kobayashi et al. | |

FOREIGN PATENT DOCUMENTS

| | | |
|---|---|---|
| JP | 2002-021948 A | 1/2002 |
| JP | 2002-339990 A | 11/2002 |
| JP | 2008-240874 A | 10/2008 |

\* cited by examiner

WAVE GENERATOR AND STRAIN WAVE GEARING

TECHNICAL FIELD

The present invention relates to a wave generator provided with a part where a support bearing for supporting an input shaft is arranged, and also relates to a strain wave gearing.

BACKGROUND ART

A strain wave gearing is composed of three members: a rigid internally toothed gear, a flexible externally toothed gear, and a wave generator. A unitary strain wave gearing with an output flange linked with an externally toothed gear is described in Patent Document 1. A flat-profile strain wave gearing used as a reducing mechanism that is fitted onto a motor shaft of an electric motor is described in Patent Document 2. The motor shaft is linked with the wave generator in the flat-design strain wave gearing, and the motor shaft is rotatably supported by a support bearing.

The strain wave gearings disclosed in Patent Document 1 and 2 are typically fitted by the user. The wave generator attached to the motor shaft is assembled on the inside of the externally toothed gear fitted to the inside of the internally toothed gear. Axial positioning of the assembled wave generator and other work is necessary.

A unitary strain wave gearing in which the three members are formed integrally in advance is proposed in Patent Document 3. According to Patent Document 3, the input shaft of the wave generator is supported by the internally toothed gear via a support bearing. The internally toothed gear and externally toothed gear are linked together by a linking member so as to allow relative rotation therebetween, and prevent any deviation from the central axis direction. Since the central-axis position of the wave generator is restricted by the support bearing in a unitary strain wave gearing, the wave generator does not need to be axially positioned as a part of the work performed to attach the wave generator to the motor shaft.

PRIOR ART DOCUMENTS

Patent Documents

Patent Document 1: JP-A 2002-339990
Patent Document 2: JP-A 2008-240874
Patent Document 3: JP-A 11-72147

SUMMARY OF THE INVENTION

Problems to be Solved by the Invention

In the strain wave gearing as disclosed in Patent Document 3, the input shaft integrated with the wave generator is supported by a support bearing which is arranged axially adjacent to the wave generator. In order to ensure there is adequate space in which to install the support hearing, the axial length of the strain wave gearing is proportionally increased, making it less convenient when flattening the strain wave gearing.

Furthermore, an input shaft such as a motor shaft linked to the wave generator is supported by a support bearing in the strain wave gearings disclosed in Patent Documents 1 and 2 as well. In addition to the strain wave gearing, it is necessary to ensure adequate space to install the support bearing; therefore, the axial length of the device in which the strain wave gearing is assembled is proportionally increased, making it less convenient when flattening the device.

An object of the present invention is to provide a wave generator suited to realize a flat strain wave gearing of reduced axial length. Another object of the present invention is to provide a flat strain wave gearing comprising the wave generator.

Means Used to Solve the Problems

In order to achieve the abovementioned objects, according to the present invention, there is provided a wave generator of a strain wave gearing, in which the wave generator is arranged coaxially inside a flexible externally toothed gear, flexes the externally toothed gear into a non-circular configuration to mesh partially with a rigid internally toothed gear, and causes to move meshed position between the externally toothed gear and the internally toothed gear in a circumferential direction, the wave generator of the strain wave gearing being characterized in comprising:

a rigid plug;

a wave generator bearing installed on a non-circular outer peripheral surface of the plug; and a bearing arrangement part;

the bearing arrangement part being a section having arranged therein a support bearing for supporting an input shaft connected to the plug from a first side along a central axis relative to the plug;

a center-side plug end surface portion of a first-side-facing plug end surface of the plug being set back toward a second side relative to a first-side-facing outer race end surface of an outer race of the wave generator bearing, the second side being opposite the first side along the central axis; and the bearing arrangement part being formed in a portion between the outer race end surface and the center-side plug end surface portion, in a direction of the central axis.

In the wave generator according to the present invention, the bearing arrangement part is positioned within the width dimension of the wave generator in the central axis direction. Therefore, when a strain wave gearing provided with the wave generator is connected to a motor shaft or other input shaft, and the input shaft is supported by the support bearing, the support bearing will be accommodated within the width dimension of the wave generator in the central axis direction. Devices incorporating the strain wave gearing do not require the space in which the wave generator is to be implemented in the central-axis direction to be supplemented by space for the support bearing to be installed. It is accordingly possible to obtain a flat strain wave gearing of reduced axial length.

In addition, according to the present invention, there is provided a wave generator of a strain wave gearing, in which the wave generator is arranged coaxially inside a flexible externally toothed gear, flexes the externally toothed gear into a non-circular configuration to mesh partially with a rigid internally toothed gear, and causes to move meshed position between the externally toothed gear and the internally toothed gear in a circumferential direction, the wave generator of the strain wave gearing being characterized in comprising:

a rigid plug;

a wave generator bearing installed on a non-circular outer peripheral surface of the plug;

an input shaft that protrudes from a central part of the plug toward a first side along a central axis; and a bearing arrangement part in which a support bearing for supporting the input shaft is arranged;

a center-side plug end surface portion of a first-side-facing plug end surface of the plug being set back toward a second side relative to a first-side-facing outer race end surface of an outer race of the wave generator bearing, the second side being opposite the first side along the central axis, and the center-side plug end surface portion surrounding the input shaft; and the bearing arrangement part being formed between the outer race end surface, which surrounds the input shaft, and the center-side plug end surface portion, in a direction of the central axis.

In the wave generator according to the present invention, the bearing arrangement part is positioned within the width dimension of the wave generator in the direction of the central axis. Therefore, in a strain wave gearing provided with the wave generator, the support bearing is accommodated within the width dimension of the wave generator in the direction of the central axis. It is not necessary for the space in which the wave generator is to be implemented in the direction of the central axis to be supplemented with space in which the support bearing is to be implemented. It is accordingly possible to obtain a flat strain wave gearing provided with a support bearing, the strain wave gearing being of reduced axial length.

In the present invention, the first-side-facing inner race end surface of the inner race of the wave generator bearing is preferably set back toward the second side along the direction of the central axis relative to the outer race end surface.

The portion of the wave generator extending from the center-side plug end surface portion to the inner race end surface is set back toward the second side relative to the outer race end surface. It is possible to reliably ensure that, between the outer race end surface and the portion extending from the center-side plug end surface portion to the inner race end surface, space for installing a bearing holder for holding the support bearing is provided in addition to the bearing arrangement part in which the support bearing is arranged.

In the present invention, it is possible to configure the parts in the following manner to ensure space for the bearing arrangement part within the width dimension of a wave generator. Specifically, the plug comprises a disc-shaped portion and an annular portion integrated with the disc-shaped portion, the annular portion surrounding the outer periphery of the disc-shaped portion, and the non-circular outer peripheral surface being formed on the outer peripheral surface of the annular portion. The disc-shaped portion comprises a center-side disc portion spreading out perpendicularly with respect to the central axis, an inclined disc portion spreading out in a direction inclined from the outer peripheral edge of the center-side disc portion toward the first side, and an outer-peripheral-side disc portion spreading out from the outer peripheral edge of the inclined disc portion perpendicularly with respect to the central axis. The width dimension of the annular portion in the central-axis direction is larger than the thickness of the outer-peripheral-side disc portion, and the central-axis-direction central part of the inner peripheral surface of the disc-shaped portion is connected to the outer-peripheral-side disc portion. In such circumstances, the input shaft protrudes from the central portion of the center-side disc portion, and the first-side end surface of the center-side disc portion is the center-side plug end surface portion.

Next, a strain wave gearing of the present invention is characterized in comprising:

a rigid internally toothed gear;

a radially flexible externally toothed gear arranged coaxially inside the internally toothed gear;

the wave generator of the abovementioned configuration; and a support bearing for rotatably supporting the input shaft, the support bearing being arranged in the bearing arrangement part of the wave generator.

Here, a bearing holder for holding a support bearing can be integrated into, or attached to, the inside peripheral edge part of a disc-shaped end plate which extends towards the center of the internally toothed gear from a first-side-facing internally toothed end surface of the internally toothed gear. In this case, the support bearing is mounted in the space between the bearing holder and the outer peripheral surface of the input shaft.

Next, in the case that the externally toothed gear is either cup-shaped or top-hat-shaped, the externally toothed gear is arranged so that an open end faces the first side.

A unit-type strain wave gearing according to the present invention comprises, in addition to the abovementioned configuration, an output member attached coaxially to a boss formed in a second-side end part of the externally toothed gear, and a main bearing for supporting the externally toothed gear so as to allow relative rotation with respect to the internally toothed gear.

MODE FOR CARRYING OUT THE INVENTION

An embodiment of the strain wave gearing in which the present invention is applied is described below in reference to the drawings. The strain wave gearing as detailed below is an example of a cup-shaped strain wave gearing provided with an input shaft and a support bearing.

(Overall Configuration)

Figure 1:
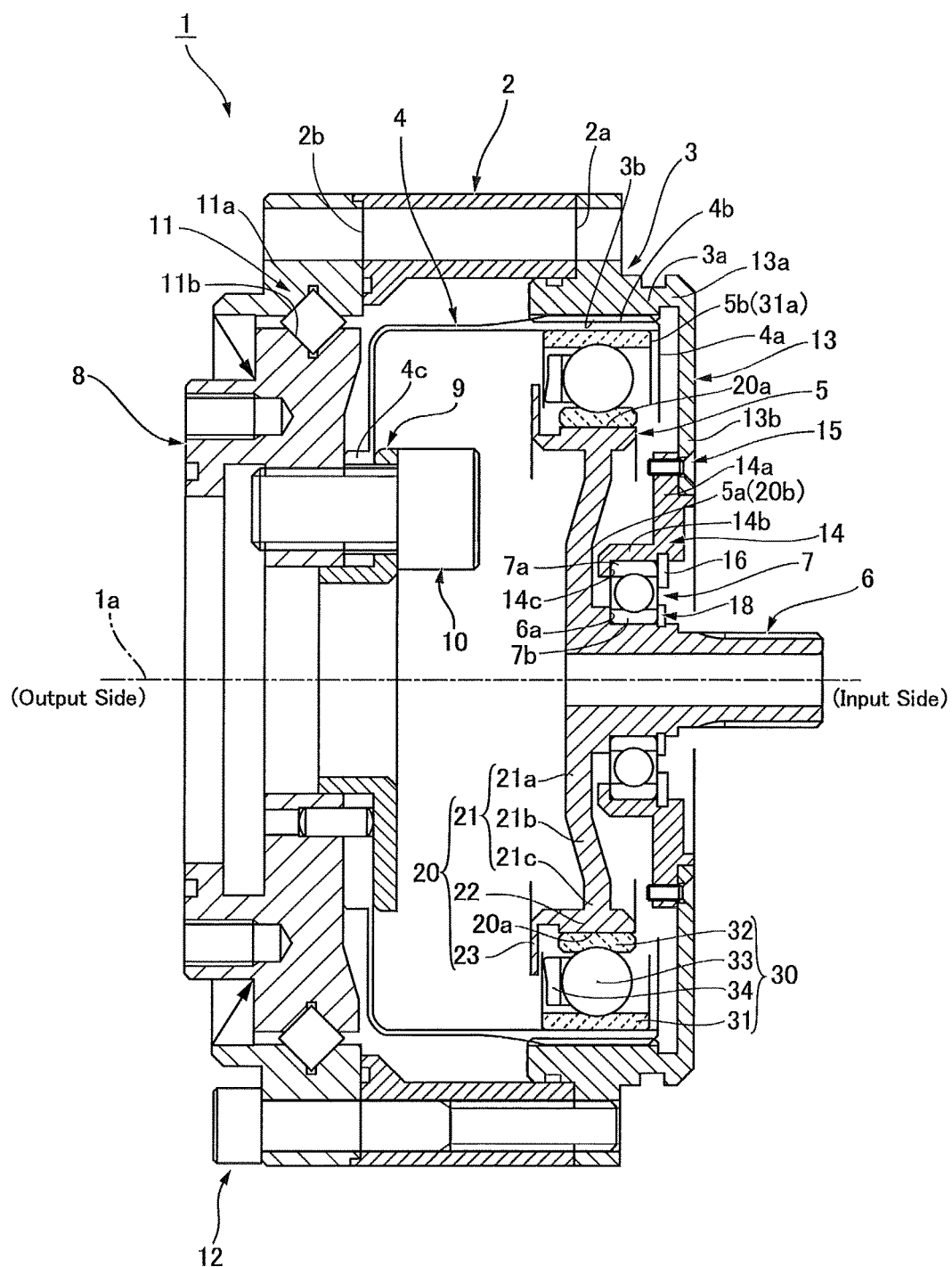
FIG. 1 is a longitudinal sectional view showing a unit-type strain wave gearing in which the present invention is applied.
Figure 2:
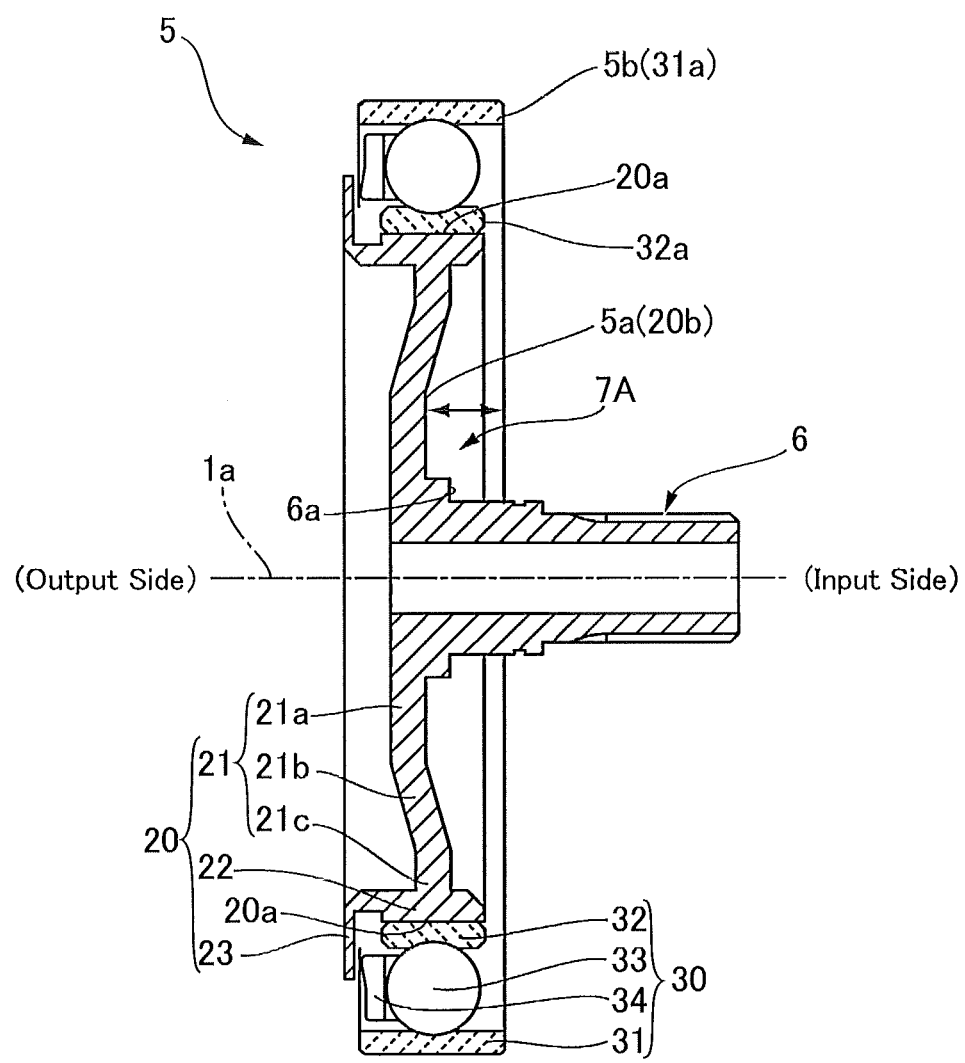
FIG. 2 is a longitudinal sectional view showing the wave generator of the strain wave gearing of FIG. 1.

FIG. 1 is a longitudinal sectional view showing a cup-shaped strain wave gearing according to an embodiment of the present invention, and FIG. 2 is a longitudinal sectional view showing the wave generator. A strain wave gearing 1 has a cylindrical unit housing 2. An annular, rigid, internally toothed gear 3 is fixed coaxially to an annular end surface 2a which faces an input side, which is the first side along a central axis 1a in the unit housing 2. A cup-shaped, flexible, externally toothed gear 4 is arranged coaxially inside the internally toothed gear 3. The externally toothed gear 4 is arranged so that an open end 4a thereof faces the input side. A wave generator 5 is installed coaxially on the inside of a portion of the externally toothed gear 4 where external teeth 4b are formed. An input shaft 6 protrudes from a center part of the wave generator 5 toward the input side. The input shaft 6 is rotatably supported via a support bearing 7 on a side of the internally toothed gear 3.

An annular boss 4c is formed in a portion of the externally toothed gear 4 located in the center of the bottom of the cup shape. The boss 4c is a rigid body portion of greater wall thickness than that of other portions of the externally toothed gear 4. A disc-shaped output flange 8 is arranged coaxially with respect to the boss 4c on an output side (the second side opposite the first side along the central axis 1a). The boss 4c is fixed to the output flange 8 by a plurality of fastening bolts 10 so as to be interposed between the output flange 8 and an annular retaining member 9 attached to the input side of the boss 4c.

The output flange 8 is rotatably supported by the unit housing 2 with a cross roller bearing 11 that is the main bearing interposed therebetween. The cross roller bearing 11 has an annular outer race 11a that is fixed coaxially to an annular end surface 2b on the output side of the unit housing 2. In this example, the outer race 11a, the unit housing 2, and the internally toothed gear 3 are securely fastened by a plurality of fastening bolts 12. An inner race of the cross roller bearing 11 is integrally formed with the outer peripheral portion of the output flange 8, and an inner-race track surface 11b having a V-shaped cross-section is formed in the circular outer peripheral surface of the output flange 8.

In the strain wave gearing 1 of the above configuration, a portion of the externally toothed gear 4 where the external teeth 4b are formed is flexed by the wave generator 5 into a non-circular configuration; e.g., an ellipsoidal configuration, and the external teeth 4b mesh with the internal teeth 3b of the internally toothed gear 3 at two locations along the major axis direction of the ellipsoidal configuration. The input shaft 6 is connected to a rotating shaft such as a motor shaft, and high-speed rotation is inputted to the input shaft. When the wave generator 5 is caused to rotate by the high-speed rotation inputted via the input shaft 6, the positions where the gears 3 and 4 mesh move circumferentially. When the wave generator 5 completes one rotation, the gears 3 and 4 rotate relative to each other according to the difference in the number of teeth between both gears 3 and 4. Usually, the internally toothed gear 3 is fixed so as not to rotate, and the externally toothed gear 4 rotates at a dramatically lower speed relative to the rotation of the wave generator 5. The reduced rotation of the externally toothed gear 4 is extracted from the output flange 8 and transferred to a member of a driven side (not shown).

(Configuration of the Parts)

The input-side-facing end surface portion of the wave generator 5 has a center-side end surface portion 5a that surrounds the input shaft 6, and an outer-peripheral-side end surface portion 5b. The center-side end surface portion 5a is set back toward the output side along the central axis 1a by a prescribed distance relative to the outer-peripheral-side end surface portion 5b. The support bearing 7 supporting the input shaft 6 is arranged in a bearing arrangement part 7A (refer to FIG. 2) that is formed between the center-side end surface portion 5a and the outer-peripheral-side-end surface portion 5b in the direction of the central axis 1a. In other words, the support bearing 7 is accommodated within the maximum width dimension of the wave generator 5 with respect to the direction of the central axis 1a, without protruding from the wave generator 5 toward the input side.

A disc-shaped end plate 13 is integrally formed with an input-side annular internally-toothed-gear end part 3a of the internally toothed gear 3. An annular portion 13a that protrudes slightly toward the output side along the central axis 1a is formed in the outer peripheral edge portion of the end plate 13, the annular portion 13a being connected to the internally-toothed-gear end part 3a. A bearing holder 14 is coaxially fixed by a plurality of screws 15 to a circular internal peripheral edge part 13b of the end plate 13, the bearing holder being fixed on the output side of the circular internal peripheral edge part 13b. It is also possible for the bearing holder 14 to be integrated with the end plate 13. The bearing holder 14 has a disc-shaped portion 14a fixed to the internal peripheral edge part 13b of the end plate 13, and an annular holder body part 14b which extends in a direction along the central axis 1a toward the output side from the internal peripheral edge of the disc-shaped portion 14a. The support bearing 7 is installed between the holder body part 14b and the external peripheral surface portion of the input shaft 6 facing the holder body part 14b.

An outer race 7a of the support bearing 7 is installed on the inner peripheral surface of the holder body part 14b. The outer race 7a is positioned in the direction of the central axis 1a by an outer-race-restraining step surface 14c that is formed on the output-side distal end edge of the holder body part 14b, and an outer race restrainer 16 that is attached to the input-side end-part inner peripheral surface of the holder body part 14b. An inner race 7b of the support bearing 7 is installed on the outer peripheral surface of the input shaft 6. The inner race 7b is positioned in the direction of the central axis 1a by an inner-race-restraining step surface 6a that is formed on the outer peripheral surface of the input shaft 6, and an inner race restrainer 18 that is attached to the outer peripheral surface.

The wave generator 5 has a disc-shaped rigid plug 20 and a wave generator bearing 30. An outer peripheral surface 20a of the plug 20 is a non-circular outer peripheral surface; e.g., an ellipsoidal outer peripheral surface, and the wave generator bearing 30 is installed on the ellipsoidal outer peripheral surface 20a. The center-side-end surface portion 5a of the wave generator 5 is a center-side plug end surface portion 20b of an output-side-facing plug end surface of the plug 20. The outer-peripheral-side end surface portion 5b is an input-side-facing annular outer race end surface 31a of an outer race 31 of the wave generator bearing 30.

The plug 20 has a disc-shaped portion 21 and an annular portion 22 that is integrated in a state of surrounding the outer peripheral edge of the disc-shaped portion 21. The outer peripheral surface of the annular portion 22 serves as the outer peripheral surface 20a of the plug 20. The disc-shaped portion 21 has a center-side disc-shaped portion 21a that spreads out perpendicularly with respect to the central axis 1a, an inclined disc-shaped portion 21b that extends in a direction inclined toward the input side from the outer peripheral edge of the center-side disc-shaped portion 21a, and an outer-peripheral-side disc-shaped portion 21c that spreads out perpendicularly with respect to the central axis 1a from the outer peripheral edge of the inclined disc-shaped portion 21b.

The width of the annular portion 22 of the plug 20 in the direction of the central axis 1a is greater than the thickness of the outer-peripheral-side disc-shaped portion 21c. The annular portion 22 is connected to the outer-peripheral-side disc-shaped portion 21c in the central part of the inner peripheral surface of the annular portion 22 in the direction of the central axis 1a. An annular retainer restraint 23 is integrated with the output-side end part of the annular portion 22, the retainer restraint protruding in an annular fashion toward the output side and then extending outward perpendicularly with respect to the central axis 1a.

The wave generator bearing 30 has a radially flexible outer race 31 and inner race 32, a plurality of balls 33 mounted therebetween, and a retainer 34 for holding the balls 33 at a fixed gap in the circumferential direction. The centers of the outer race 31 and inner race 32 in the direction of the central axis 1a (widthwise center) are arranged to be aligned with the center of the balls 33. Also, the outer race 31 is wider than the inner race 32. Therefore, an input-side-facing inner race end surface 32a of the inner race 32 is set back relative to the outer race end surface 31a by a prescribed distance toward the output side along the direction of the central axis 1a. The annular portion 22 of the plug 20 is substantially as wide as the inner race 32. The input-side-facing outer race end surface 31a protrudes maximally toward the input side in the wave generator 5.

Thus, in cross-section, the plug 20 of the wave generator 5 is configured such that the center-side portion of the plug 20 is set back toward the output side relative to the outer-peripheral-side portion. Therefore, the bearing arrangement part 7A in which the support bearing 7 can be mounted is formed between the center-side-end surface portion 5a (20b), which is set back maximally toward the output side, and the outer-peripheral-side-end surface portion 5b (31a) of the wave generator 5. Since the support bearing 7 is arranged in this bearing arrangement part 7A, the axial length of the strain wave gearing 1 can be made smaller than when the support bearing 7 is arranged in a position protruding toward the input side from the input-side end surface (outer-peripheral-side-end surface portion 5b) of the wave generator 5.

Also, according to the present example, the inner race end surface 32a of the wave generator bearing 30 is also set back toward the output side relative to the outer race end surface 31a. The bearing holder 14 for holding the support bearing 7 can be arranged in an outer-peripheral-side section of the support bearing 7 without interfering with the inner race 32 or plug 20.

Other Embodiments

The present invention can likewise be applied to the top-hat-type strain wave gearing shown in FIG. 3 of Patent Document 3, and the flat-type strain wave gearing as taught in Patent Document 2.

Furthermore, the present invention can also be applied to strain wave gearings having three members: an internally toothed gear, an externally toothed gear, and a wave generator provided with an input shaft; i.e., to strain wave gearings latterly fitted with a support bearing. Here as well, a support bearing attached when fitted to an input shaft such as a motor shaft is arranged in a bearing arrangement part provided in the wave generator, and accommodated within the width dimension of the wave generator. It is accordingly possible to minimize any increase in the axial length of an apparatus in which a strain wave gearing is incorporated, which is advantageous when making the device flatter.

In addition, the present invention can likewise be applied to strain wave gearings latterly fitted with a support bearing and input shaft such as a motor shaft. In such applications there is provided a shaft linking part, such as a shaft hole, for linking an input shaft such as a motor shaft to a plug of a wave generator (refer to FIGS. 1 and 3 in Patent Document 1), and a bearing arrangement part is provided in a portion that surrounds the outer periphery of the shaft linking part such as a shaft hole. Since space allowing the support bearing to be implemented in a motor or other device in which a strain wave gearing is incorporated is equally unnecessary in such instances, it is possible to minimize any increase in the axial length of the device.

The invention claimed is:

1. A wave generator of a strain wave gearing, in which the wave generator is arranged coaxially inside a flexible externally toothed gear, flexes the externally toothed gear into a non-circular configuration to mesh partially with a rigid internally toothed gear, and causes to move meshed position between the externally toothed gear and the internally toothed gear in a circumferential direction, the wave generator of the strain wave gearing comprising:
   a rigid plug;
   a wave generator bearing installed on a non-circular outer peripheral surface of the plug; and
   a bearing arrangement part; wherein
   the bearing arrangement part is a section having arranged therein a support bearing for supporting an input shaft connected to the plug from a first side along a central axis relative to the plug;
   the plug has a plug end surface facing the first side, and a center-side plug end surface portion of the plug end surface is set back toward a second side relative to an outer race end surface of an outer race of the wave generator bearing, the outer race end surface facing the first side and the second side being opposite the first side along the central axis; and
   the bearing arrangement part is formed in a portion between the outer race end surface and the center-side plug end surface portion, in a direction of the central axis.

2. The wave generator of the strain wave gearing according to claim 1, wherein
   an inner race of the wave generator bearing has an inner race end surface facing the first side that is set back toward the second side along the direction of the central axis relative to the outer race end surface.

3. The wave generator of the strain wave gearing according to claim 1, wherein
   the plug has a disc-shaped portion and an annular portion integrally formed with the disc-shaped portion in a state of surrounding an outer peripheral edge of the disc-shaped portion, the non-circular outer peripheral surface being formed on an outer peripheral surface of the annular portion;
   the disc-shaped portion has a center-side disc-shaped portion that spreads out perpendicularly with respect to the central axis, an inclined disc-shaped portion that extends in a direction inclined toward the input side from an outer peripheral edge of the center-side disc-shaped portion, and an outer-peripheral-side disc-shaped portion that spreads out perpendicularly with respect to the central axis from an outer peripheral edge of the inclined disc-shaped portion;
   the annular portion has a width in the direction of the central axis that is greater than a thickness of the outer-peripheral-side disc-shaped portion, and the annular portion has a central part of an inner peripheral surface in the direction of the central axis, the central part being connected to the outer-peripheral-side disc-shaped portion; and
   an end surface of the center-side disc-shaped portion facing the first side is the center-side plug end surface portion.

4. A strain wave gearing comprising:
   a rigid internally toothed gear;
   a radially flexible externally toothed gear arranged coaxially inside the internally toothed gear; and
   the wave generator according to claim 1.

5. The wave generator of the strain wave gearing according to claim 1, comprising:
   an input shaft that protrudes from a central part of the plug toward the first side.

6. The wave generator of the strain wave gearing according to claim 5, wherein the wave generator bearing has an inner race, and an inner race surface of the inner race facing the first side is set back toward the second side along the direction of the central axis relative to the outer race end surface.

7. The wave generator of the strain wave gearing according to claim 5, wherein
the plug has a disc-shaped portion and an annular portion integrally formed with the disc-shaped portion in a state of surrounding an outer peripheral edge of the disc-shaped portion, the non-circular outer peripheral surface being formed on an outer peripheral surface of the annular portion;
the disc-shaped portion has a center-side disc-shaped portion that spreads out perpendicularly with respect to the central axis, an inclined disc-shaped portion that extends in a direction inclined toward the input side from an outer peripheral edge of the center-side disc-shaped portion, and an outer-peripheral-side disc-shaped portion that spreads out perpendicularly with respect to the central axis from an outer peripheral edge of the inclined disc-shaped portion;
the annular portion has a width in the direction of the central axis that is greater than a thickness of the outer-peripheral-side disc-shaped portion, and the annular portion has a central part of an inner peripheral surface in the direction of the central axis, the central part being connected to the outer-peripheral-side disc-shaped portion; and
an end surface of the center-side disc-shaped portion facing the first side is the center-side plug end surface portion.

8. A strain wave gearing characterized in comprising:
a rigid internally toothed gear;
a radially flexible externally toothed gear arranged coaxially inside the internally toothed gear;
the wave generator according to claim 5; and
a support bearing that is arranged in the bearing arrangement part of the wave generator and rotatably supports the input shaft.

9. The strain wave gearing according to claim 8, comprising:
a disc-shaped end plate extending toward a center of the internally toothed gear from an internal-toothed-gear end surface of the internally toothed gear facing the first side; and
a bearing holder integrally formed on or attached to an inner peripheral edge part of the end plate,
the support bearing being installed between the bearing holder and an outer peripheral surface of the input shaft.

10. The strain wave gearing according to claim 9, wherein
the externally toothed gear is either cup-shaped or top-hat-shaped, and
the externally toothed gear is arranged so that an open end thereof faces the first side.

11. The strain wave gearing according to claim 10, comprising:
a boss formed on an end of the second side of the externally toothed gear;
an output member coaxially attached to the boss; and
a main bearing for supporting the externally toothed gear in a relatively rotatable state with respect to the internally toothed gear.

* * * * *